US012584559B2

(12) United States Patent
Mohr et al.

(10) Patent No.: US 12,584,559 B2
(45) Date of Patent: Mar. 24, 2026

(54) THROTTLE ELEMENT FOR REDUCING THE PRESSURE OF A PROCESS FLUID

(71) Applicant: SAMSON Aktiengesellschaft, Frankfurt am Main (DE)

(72) Inventors: Stefan Mohr, Frankfurt am Main (DE); Jonas Waid, Darmstadt (DE)

(73) Assignee: SAMO AKTIENGSELLSCHAFT (DE)

( * ) Notice: Subject to any disclaimer, the term of this patent is extended or adjusted under 35 U.S.C. 154(b) by 0 days.

(21) Appl. No.: 18/564,718

(22) PCT Filed: May 5, 2022

(86) PCT No.: PCT/EP2022/062186
§ 371 (c)(1),
(2) Date: Nov. 28, 2023

(87) PCT Pub. No.: WO2022/248187
PCT Pub. Date: Dec. 1, 2022

(65) Prior Publication Data
US 2024/0271706 A1 Aug. 15, 2024

(30) Foreign Application Priority Data
May 28, 2021 (DE) ..................... 20 2021 102 939.0

(51) Int. Cl.
*F16K 1/52* (2006.01)
*F16K 47/08* (2006.01)
*B33Y 10/00* (2015.01)
*B33Y 80/00* (2015.01)

(52) U.S. Cl.
CPC ................ *F16K 1/52* (2013.01); *F16K 47/08* (2013.01); *B33Y 10/00* (2014.12); *B33Y 80/00* (2014.12)

(58) Field of Classification Search
CPC ................................... F16K 1/52; F16K 47/08
See application file for complete search history.

(56) References Cited

U.S. PATENT DOCUMENTS

| | | | |
|---|---|---|---|
| 2,975,478 A | 3/1961 | Finster | |
| 4,024,891 A | 5/1977 | Engel et al. | |
| 4,108,210 A | 8/1978 | Luthe et al. | |
| 4,125,129 A * | 11/1978 | Baumann | F16K 47/04 137/625.37 |
| 4,149,563 A | 4/1979 | Seger | |

(Continued)

FOREIGN PATENT DOCUMENTS

| | | |
|---|---|---|
| CN | 109 469 769 A | 3/2019 |
| DE | 24 31 322 A1 | 1/1976 |

(Continued)

*Primary Examiner* — Michael R Reid
(74) *Attorney, Agent, or Firm* — Frijouf, Rust & Pyle, P.A.

(57) ABSTRACT

The invention relates to a throttle element (100) for reducing the pressure of a process fluid, comprising a throttle body that has multiple throttle channels (104) through which the process fluid is to flow, wherein each throttle channel (104) has an upstream inlet opening (106), a channel section (108), and a downstream outlet opening (110) when viewed in the flow direction (S). The invention is characterized in that the inlet openings (106) are designed to have a truncated conical inlet region (106-1) which tapers in the flow direction (S) and a spherical region (106-2) adjoining said inlet region.

14 Claims, 2 Drawing Sheets

(56)  References Cited

U.S. PATENT DOCUMENTS

| | | | | |
|---|---|---|---|---|
| 7,802,592 | B2* | 9/2010 | McCarty | F16K 47/08 |
| | | | | 137/625.3 |
| 10,215,306 | B2 | 2/2019 | Braeuer | |
| 10,508,754 | B2 | 12/2019 | Norberg et al. | |
| 10,871,243 | B2 | 12/2020 | Sander et al. | |
| 10,900,591 | B2* | 1/2021 | Gabriel | B33Y 80/00 |
| 10,989,234 | B2* | 4/2021 | Jouenne | F15D 1/02 |
| 11,339,897 | B2* | 5/2022 | Gabriel | F16K 47/08 |
| 11,598,449 | B2* | 3/2023 | Der Lieck | F16K 47/08 |
| 2007/0240774 | A1 | 10/2007 | McCarty | |
| 2009/0026395 | A1* | 1/2009 | Perrault | F16K 47/08 |
| | | | | 251/127 |
| 2013/0037153 | A1* | 2/2013 | Schommer | E03C 1/08 |
| | | | | 138/44 |
| 2017/0234440 | A1* | 8/2017 | Detmers | F16K 3/34 |
| | | | | 251/118 |

FOREIGN PATENT DOCUMENTS

| | | | |
|---|---|---|---|
| DE | 10 2015 005 611 | A1 | 11/2016 |
| DE | 10 2015 016 902 | A1 | 6/2017 |
| DE | 10 2016 102 756 | A1 | 5/2018 |
| WO | WO 2013 025 421 | A1 | 2/2013 |
| WO | WO 2017 054 961 | A1 | 4/2017 |
| WO | WO 2018 217 454 | A1 | 11/2018 |

* cited by examiner

THROTTLE ELEMENT FOR REDUCING THE PRESSURE OF A PROCESS FLUID

This patent application is the national phase entry of PCT/EP2022/062186, international application filing date May 5, 2022, which claims the benefit and priority of and to German patent application no. 20 2021 102 939.0, filed May 28, 2021.

BACKGROUND OF THE INVENTION

The invention relates to a throttle element for reducing the pressure of a process fluid, in particular for reducing pressure in a process plant, as well as to a control valve.

As is well known, in process plants, process fluid flows are supplied to process engineering processes in process fluid lines via control valves. These process fluid flows must be set in accordance with the respective process and operation according to specific control variables, including the flow rate. It is well known furthermore to provide so-called throttle elements in process engineering systems for reducing pressure.

These types of throttle elements are sufficiently well known in the art and generally comprise a throttle body having multiple through channels through which a process fluid is to flow. A generic throttle element of this type is known from DE 10 2015 005 611 A1, for example.

It is also known in the art that an appropriate design of the throttle channels in the throttle body will allow flow, pressure reduction and cavitation to be deliberately influenced. In addition to a design of the throttle channels as round, square or elongated holes having a straight or twisted course over their entire length, see DE 10 2015 005 611 A1, throttle channels with curved, inclined, conical inner walls and/or with inner walls provided with edges and/or undercuts are also known, see DE 10 2016 102 756 A1.

A throttle element can be arranged in the process plant in a variety of ways: For example, a throttle element can be designed as a component installed in the control valve, for example by designing the valve element as a perforated cone, see DE 24 31 322, or by arranging a valve cage permanently installed in the control valve and interacting with the valve element, see DE 10 2015 016 902 A1.

Alternatively, a throttle element can also be arranged directly in a process fluid line as a so-called pipe throttle, for example in the inlet or outlet region of a control valve, a pump or another field device for pressure reduction.

SUMMARY OF THE INVENTION

It is the object of the invention to further develop a throttle element in such a way that cavitation and wear is reduced during operation.

This object is accomplished by the characterizing features of the independent claims in conjunction with the features of its preamble.

Dependent claims relate to advantageous further embodiments of the throttle element according to the invention.

The invention is based on the realization that the geometry of the inlet openings of the throttle channels has a decisive effect on the low pattern and thus on cavitation and wear.

In a known manner, the throttle element comprises a throttle body with multiple throttle channels through which the process fluid is to flow. In other words, when viewed in the flow direction S, each throttle channel thus has an upstream inlet opening, an adjoining channel section and a downstream outlet opening.

The present invention now provides for the upstream inlet openings to have two regions, namely a truncated conical inlet region which tapers in the flow direction S, and a spherical or ball-shaped region adjoining said inlet region. While the truncated conical inlet region provides a kind of centering effect to improve the flow of the process fluid into the inlet openings, the adjoining spherical or ball-shaped region allows the process fluid to be evenly distributed before it enters the subsequent channel sections of the throttle channels. The design according to the invention has the effect that—because flow stalls, dead spaces and/or turbulence are now largely avoided and thus almost the entire throttle channel cross-section is utilized—an almost uniform flow distribution is ensured, which in turn advantageously results in a reduced tendency to cavitation and wear.

In order to ensure sufficient 'centering' of the flow as the process fluid enters the inlet openings, the truncated conical inlet regions of the inlet openings preferably have a taper angle $\alpha$, for which the following applies: $15°\leq$ taper angle $\alpha\leq75°$.

A further preferred embodiment of the throttle element according to the invention provides for the spherical regions of the inlet openings to be essentially hemispherical in shape.

In order to further reduce the risk of turbulence occurring as the flow subsequently passes from the truncated conical inlet regions into the adjoining spherical regions, rounded transition regions are preferably formed between the truncated conical inlet regions and the adjoining spherical regions. A rounded transition region is to be understood in particular as meaning that the transition between the truncated conical inlet region and the spherical region is smooth or edgeless, i.e. in that a transition radius is provided between the two regions.

In order to ensure that the flow from the spherical regions into the adjoining channel sections of the throttle channels is as turbulence-free as possible, another preferred embodiment of the invention provides for the spherical regions of the inlet openings to merge in a rounded and/or tangential manner into the adjoining channel sections of the throttle channels.

Preferably, the channel sections have a circular channel cross-section. However, channel cross-sections of a shape other than circular are also conceivable, in particular oval or polygonal channel cross-sections with rounded corners.

Yet another preferred embodiment of the throttle element according to the invention is characterized by the fact that the channel sections of the throttle channels are designed with a continuously increasing channel cross-section in the flow direction S and from the spherical region to the outlet opening. The continuously increasing channel cross-section has the effect of preventing an increase in the process fluid flow rate as it flows through, which has the advantage of successfully preventing material damage to the throttle body resulting from too high process fluid flow rates, thus ensuring a longer service life.

Preferably, the upstream inlet openings of the throttle channels have the same geometry. In other words, the inlet openings all have the same design, in particular with an identical taper angle $\alpha$. The advantage of this embodiment is that it allows for simplified and therefore cost-effective production.

However, it is also conceivable for the upstream inlet openings to have different geometries. This advantageously ensures that adaptation to existing boundary conditions, such as the position of the inlet openings in relation to a valve inlet and valve outlet, is possible.

In one embodiment of the throttle element according to the invention, the inlet openings have an essentially elliptical circumferential contour.

Preferably, the throttle element is produced in layers in an additive manufacturing process, in particular a laser sintering process or a laser melting process, in which a selective material application process or a selective material curing process is controlled on the basis of the specific geometric data of the throttle element. The advantage of producing the throttle element using an additive manufacturing process is that, in addition to fast production (no time-consuming development/production of tools/molds needed), complex geometries and structures can also be implemented easily and cost-effectively.

In an alternative embodiment of the invention, the throttle element is produced in a casting process. Preferably, the throttle element manufactured using an additive manufacturing process or a casting process is made of metal or a metal alloy.

It is the further object of the invention to develop a control valve for a process plant in such a way that operation of the control valve is optimized in terms of cavitation and wear.

This object is accomplished by the characterizing features of the claims in conjunction with the features of its preamble.

In a known manner, the control valve comprises a valve housing with a valve inlet and a valve outlet, as well as a throttle element which is arranged between the valve inlet and the valve outlet.

The present invention now provides for the throttle element to be of the design specified in any one of claims.

All the explanations regarding the throttle element according to the invention can be applied analogously to the control valve according to the invention, so that the advantages mentioned above can be achieved with it.

In a first embodiment of the control valve according to the invention, the throttle element is designed as a valve cone that is relatively movable with respect to a valve seat that is fixed to the housing.

An alternative second embodiment of the control valve according to the invention is characterized by the fact that the throttle element is designed as a valve cage that is permanently installed in the valve housing and interacts with a valve element that is movably mounted in the valve housing.

Additional advantages, features and possible applications of the present invention will be apparent from the description which follows, in which reference is made to the embodiments illustrated in the drawings.

Throughout the description, the claims and the drawings, those terms and associated reference signs are used as are stated in the list of reference signs below.

DESCRIPTION OF THE INVENTION

Figure 1:
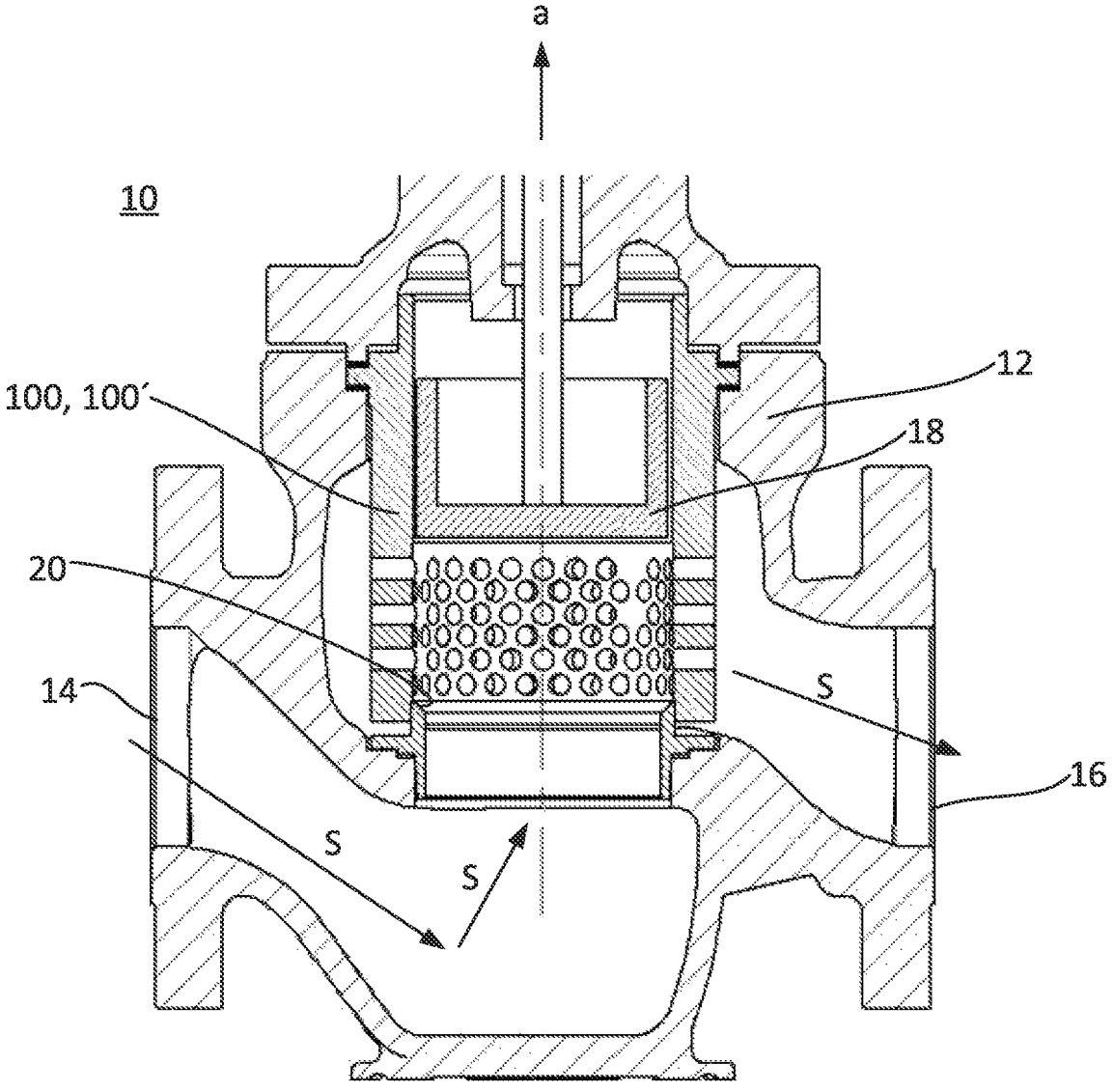
FIG. 1 is a sectional view of a control valve with a throttle element designed in the form of a valve cage.

FIG. 1 shows a control valve for a process plant, which valve is designated in its entirety by the reference numeral 10. The control valve 10 comprises a valve housing 12 with a valve inlet 14 and a valve outlet 16, a valve element 18 which is movably supported in the valve housing 12 of the cage valve 10 in the axial direction a, as well as a throttle element, designated in its entirety by the reference numeral 100, which is arranged in the flow channel of the valve housing 12, i.e. between the valve inlet 14 and the valve outlet 16.

In the present case, the throttle element 100 is designed as a valve cage that is permanently installed in the valve housing 12 and interacts with the valve element 18. Control valves of this type which have a valve cage are also known as cage valves. The valve cage designed as a throttle element is designated hereinafter by the reference sign 100'.

As is further seen in FIG. 1, the valve cage 100' is sleeve-shaped and comprises an upper guide region, when viewed in the axial direction a, which axially guides the valve element 18, and a throttle region provided underneath it comprising multiple throttle channels 104 arranged in a distributed manner in the axial direction a and in the circumferential direction u and penetrating the wall 102 of the sleeve-shaped valve cage 100'. Each throttle channel 104 has an inlet opening, designated by the reference numeral 106, on the upstream side or inside of the valve cage, a channel section designated by the reference numeral 108, and an outlet opening, designated by the reference numeral 110, on the downstream side or outside of the valve cage, see FIG. 2.

Figure 2:
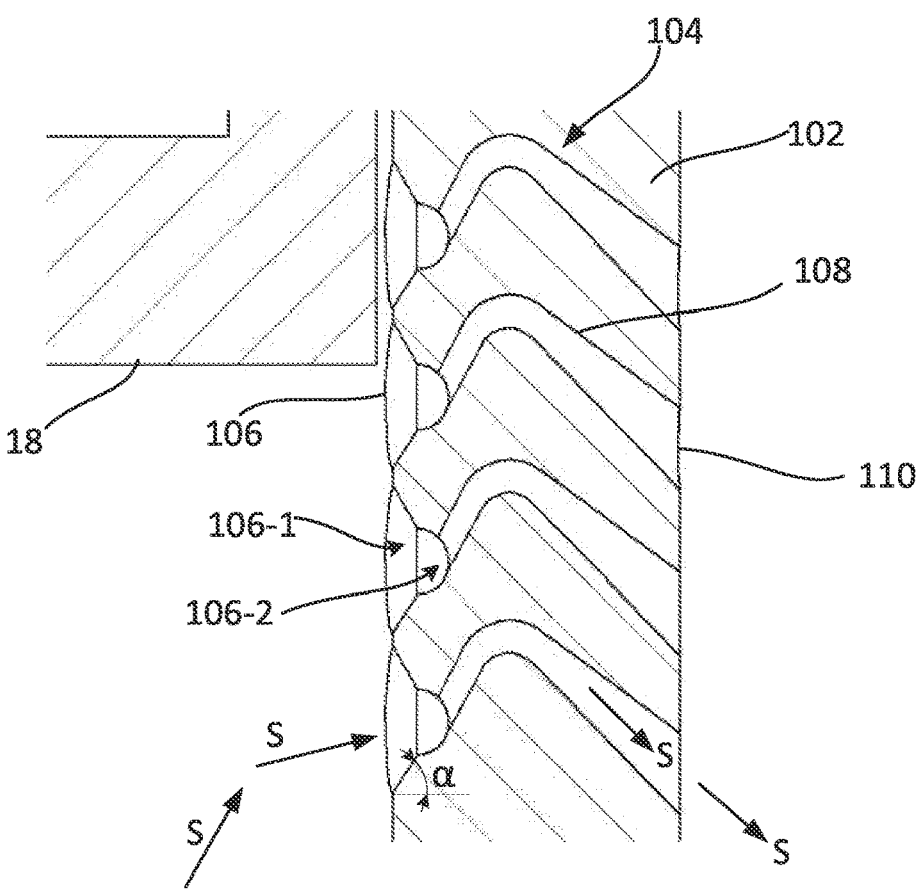
FIG. 2 is an enlarged detail of the valve cage of FIG. 1.

As indicated in FIGS. 1 and 2 by the arrows symbolizing the direction of flow S, a process fluid enters the control valve 10 via the valve inlet 14 and flows into the interior of the sleeve-shaped valve cage 100' via the lower end face. The process fluid enters the channel sections 108 via the inlet openings 106 on the upstream side or valve cage inner side, and then exits the throttle channels 104 and thus the valve cage 100' via the outlet openings 110 on the downstream side or valve cage outer side before flowing out again from the valve outlet 16 of the control valve 10.

The number of closed or opened throttle channels 104, i.e. the opening width of the valve cage 100' and hence the throttle rate, can thus be adjusted in a known manner by appropriately positioning the valve element 18 axially in relation to the valve cage 100'.

To completely close the cage valve 10, the cage valve 10 further comprises a valve seat 20 which interacts with the valve element 18 and is designed complementary to the valve element 18. The throttle element (100) is designed as a valve element that can be moved relative to a valve seat (20) which is fixed to the housing.

A known problem of this type of control valves 10 with a valve cage 100' is that diffuse flows can occur in the transition areas from the valve element 18 to the inlet openings 106 of the valve cage, resulting in the process fluid not being able to enter the throttle channels 104 evenly.

This is where the invention comes into play:

The invention is based on the realization that the inlet geometry, i.e. the design of the upstream, or valve cage inner side, inlet openings 106, is decisive for the flow pattern and the reduction of cavitation and wear.

As can be seen in particular from FIG. 2, according to the invention, the upstream, or valve cage inner side, inlet openings 106 are designed to have two regions, namely a truncated conical inlet region 106-1 which tapers in the flow direction S, and an adjoining spherical region 106-2. As can also be seen from FIG. 2, the spherical region 106-2 is hemispherical in shape. The inlet openings (106) may include different geometries. For example, the inlet openings (106) maybe elliptical in shape.

The design of the inlet openings 106 according to the invention has the effect that the truncated conical inlet region 106-1 in a kind of 'centering' enables an improved inflow of the process fluid and that a uniform distribution of the process fluid is ensured by the adjoining spherical area 106-2. This means that stalls, dead spaces and/or turbulence are avoided as far as possible and almost the entire throttle channel cross-section is utilized. This ensures an almost uniform flow distribution in an advantageous way, so that the tendency to cavitate is reduced and less wear occurs.

In the present case, the truncated conical inlet regions 106-1 of the inlet openings 106 are designed to have a taper angle α of 15°≤taper angle α≤75°

As initial tests have shown, sufficient cone taper for the intended centering of the flow is ensured when the truncated conical inlet regions 106-1 are designed in accordance with the specified taper angle interval.

Figure 3:
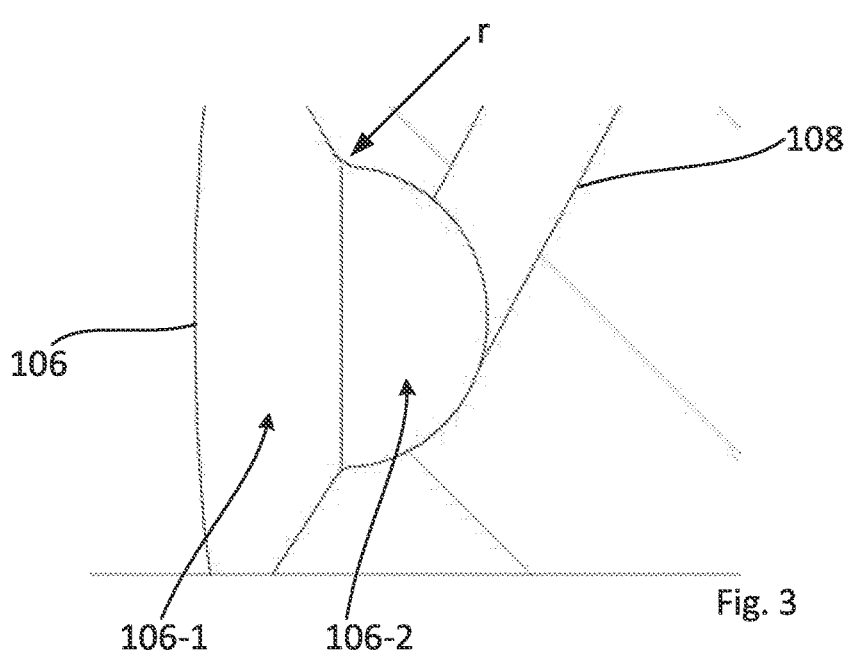
FIG. 3 is an enlarged view of an inlet opening.

In addition, in order to avoid turbulence when the process fluid lows out of the truncated conical inlet regions 106-1 and then flows into the spherical regions 106-2, the transition between the truncated conical inlet regions 106-1 and the adjoining spherical regions 106-2 is designed to be smooth. For this purpose, as can be seen in particular from FIG. 3, a transition radius r is provided between the two regions, so that the two regions 106-1 and 106-2 merge into one another without edges.

LIST OF REFERENCE SIGNS

10 control valve
12 valve body
14 valve inlet
16 valve outlet
18 valve element
20 valve seat
100 throttle element
100' valve cage
102 valve cage walls
104 throttle channels
106 inlet opening
106-1 truncated conical inlet region
106-2 spherical region
108 channel section
110 outlet opening
a axial direction
S flow direction
r radius
α taper angle

The invention claimed is:

1. A throttle element (100) for reducing the pressure of a process fluid, comprising a throttle body that has multiple throttle channels (104) through which the process fluid is to flow, wherein, when viewed in the flow direction (S), each throttle channel (104) has an upstream inlet opening (106), a truncated conical inlet region (106-1), a hemispherical region (106-2), a channel section (108), and a downstream outlet opening (110), characterized in that the inlet openings (106) are designed to have the truncated conical inlet region (106-1) which tapers in the flow direction (S), and the hemispherical region (106-2) positioned between the truncated conical inlet region (106-1) and the throttle channel (104) for providing a uniform distribution of the process fluid for reducing cavitation and wear.

2. The throttle element (100) according to claim 1, characterized in that the truncated conical inlet regions (106-1) of the inlet openings (106) have a taper angle α, for which the following applies: 15°≤taper angle α≤75°.

3. The throttle element (100) according to claim 1, characterized in that a rounded transition region is formed between the truncated conical inlet regions (106-1) and the adjoining hemispherical regions (106-2) of the inlet openings (106).

4. The throttle element (100) according to claim 1, characterized in that the hemispherical region (106-2) of the inlet openings (106) merges in a rounded and/or tangential manner into the adjoining channel section (108) of the throttle channel (104).

5. The throttle element (100) according to claim 1, characterized in that the channel sections (108) of the throttle channels (104) are circular in channel cross-section.

6. The throttle element (100) according to claim 1, characterized in that the inlet openings (106) are designed to have an identical geometry.

7. The throttle element (100) according to claim 1, characterized in that the upstream inlet openings (106) are elliptical in shape.

8. The throttle element (100) according to claim 1, characterized in that the throttle element (100) is produced in layers by an additive manufacturing process.

9. The throttle element (100) according to claim 8, characterized in that the additive manufacturing process is a laser sintering process or a laser melting process.

10. The throttle element (100) according to claim 1, characterized in that the throttle element (100) is manufactured using a casting process.

11. The throttle element (100) according to claim 1, characterized in that the throttle element (100) is made of a metallic material.

12. A control valve (10), comprising the throttle element of claim 1, and further comprising a valve housing (12) with a valve inlet (14) and a valve outlet (16), as well as a throttle element (100) which is located between the valve inlet and the valve outlet (14, 16), characterized in that the throttle element (100).

13. The control valve (10) according to claim 12, characterized in that the throttle element (100) is designed as a valve cage (100') fixed to the housing and interacting with a valve element (18) that is movably supported in the valve housing (12).

14. A throttle element (100) for reducing the pressure of a process fluid, comprising a throttle body that has multiple throttle channels (104) through which the process fluid is to flow, wherein, when viewed in the flow direction (S), each throttle channel (104) has an upstream inlet opening (106), a channel section (108), and a downstream outlet opening (110), characterized in that the inlet openings (106) are designed to have a truncated conical inlet region (106-1) which tapers in the flow direction (S), and a hemispherical region (106-2) adjoining said inlet region, and the channel sections (108) of the throttle channels (104) are designed to have a continuously increasing channel cross-section in the flow direction (S) and starting from the hemispherical region (106-1) up to the outlet opening (110).

* * * * *